(12) United States Patent
Lee et al.

(10) Patent No.: US 8,336,360 B1
(45) Date of Patent: Dec. 25, 2012

(54) NOTCH PRESSING DEVICE FOR CRASH BOX OF VEHICLE

(75) Inventors: Mun Yong Lee, Pusan (KR); Sang Jin Ha, Pusan (KR)

(73) Assignee: Sungwoo Hitech Co., Ltd., Pusan (KR)

( * ) Notice: Subject to any disclaimer, the term of this patent is extended or adjusted under 35 U.S.C. 154(b) by 0 days.

(21) Appl. No.: 13/279,489

(22) Filed: Oct. 24, 2011

(30) Foreign Application Priority Data

Oct. 17, 2011 (KR) .................. 10-2011-0105832

(51) Int. Cl.
*B21D 7/06* (2006.01)
*B21K 1/54* (2006.01)

(52) U.S. Cl. .................. 72/370.04; 72/388; 72/419

(58) Field of Classification Search .................. 72/353.4, 72/370.04, 370.06, 387, 388, 403, 419
See application file for complete search history.

(56) References Cited

U.S. PATENT DOCUMENTS

| | | | | |
|---|---|---|---|---|
| 5,396,786 A * | 3/1995 | Bartholomew et al. | ............ | 72/57 |
| 5,428,979 A * | 7/1995 | Knipp et al. | .................... | 72/372 |
| 5,898,996 A * | 5/1999 | Buchanan et al. | .............. | 72/334 |
| 6,298,701 B1 * | 10/2001 | Marando | ........................... | 72/61 |
| 6,442,992 B2 * | 9/2002 | Tsubouchi et al. | ........ | 72/370.21 |
| 6,481,260 B2 * | 11/2002 | Jung | .......................... | 72/370.04 |
| 6,494,073 B2 * | 12/2002 | Oka et al. | .................. | 72/370.06 |

\* cited by examiner

*Primary Examiner* — David B Jones
(74) *Attorney, Agent, or Firm* — Lexyoume IP Meister, PLLC.

(57) ABSTRACT

The present invention relates to a notch pressing device for a crash box of a vehicle.
The notch pressing device for a crash box of a vehicle includes a lower fixing plate, an upper fixing plate mounted to the lower fixing plate by a plurality of posts, a core rotating unit that selectively rotates a core where the crash box is put and is disposed to one end of the lower fixing plate, a supporting unit that is connected to a moving die for selectively supporting a lower portion of an end of the core and that is disposed to a side of the lower fixing plate, and a forming unit which is connected to a punch, which selectively pushes the crash box put to the core for forming the notch, and that is disposed to the upper fixing plate.

18 Claims, 14 Drawing Sheets

NOTCH PRESSING DEVICE FOR CRASH BOX OF VEHICLE

CROSS-REFERENCE TO RELATED APPLICATION

This application claims priority to and the benefit of Korean Patent Application No. 10-2011-0105832 filed in the Korean Intellectual Property Office on Oct. 17, 2011, the entire contents of which are incorporated herein by reference.

BACKGROUND OF THE INVENTION (a) Field of the Invention

The present invention relates to a notch pressing device. More particularly, the present invention relates to a notch pressing device that may form a notch in a crash box for a vehicle.

(b) Description of the Related Art

Generally, a bumper system is a part of a vehicle designed to help it withstand impact of a collision, and bumpers are disposed the front and rear of the vehicle to minimize deformation of the vehicle in a collision.

FIG. 1 is an exploded perspective view of a conventional bumper system for a vehicle.

Referring to FIG. 1, the bumper system (a conventional front bumper system) includes a bumper beam 101 disposed along vehicle width direction at the front of a vehicle, an energy absorber 103 disposed in front of the bumper beam 101 for absorbing impact, a bumper cover 105 covering the bumper beam 101 and the energy absorber 103, and a crash box (CB, also called a stay) connecting the bumper beam 101 and a front side member 107.

The crash box CB is usually assembled to the front side member 107 interposing a plate 111 therebetween, and is a hollow closed sectional square tube.

When impact energy is transmitted in a collision, the energy absorber 103 is compressed to absorb part of the impact energy, and other impact energy is absorbed by deforming the bumper beam 101 and the crash box CB.

As shown in FIG. 2, recently a notch N has been formed in the crash box CB such that the crash box CB can be stably collapsed along the length direction thereof when impact energy is transmitted.

However, for forming the notch N in the crash box CB, a notch-forming process has to be added in a press line or forging has to be implemented by a worker, and thus the process becomes inefficient.

That is, if the crash box CB is formed by 2 steel panel sheets, the notch N is formed in each panel by pressing and then the panels are assembled to form the crash box CB by welding.

However, if the crash box CB is formed by a material such as aluminum, which is formed as a closed sectional tube by extrusion molding, it is difficult to form the notch N by pressing, so hydroforming is applied to form the notch N. But in the hydroforming, manufacturing a metallic pattern is very costly, and post processing such as washing and cutting processes have to be added.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a notch pressing device for a crash box of a vehicle, which may economically form a notch in a closed sectional tube-type crash box.

A notch pressing device for a crash box of a vehicle according to an exemplary embodiment of the present invention may include a lower fixing plate, an upper fixing plate mounted to the lower fixing plate by a plurality of posts, a core rotating unit that selectively rotates a core where the crash box is put and is disposed to one end of the lower fixing plate, a supporting unit that is connected to a moving die for selectively supporting a lower portion of an end of the core and disposed to a side of the lower fixing plate, and a forming unit that is connected to a punch, which selectively pushes the crash box put to the core for forming the notch, and that is disposed to the upper fixing plate.

The core rotating unit may include a fixing die that is fixed to an upper portion of the lower fixing plate, and a motor that is disposed outside of the fixing die and of which a rotating shaft is disposed thereto.

The core may be connected to the rotating shaft and a first notch forming portion is formed to a surface of the core.

The motor may be a servo motor configured to control rotation speed and rotating direction.

The supporting unit may include a forward/backward cylinder that is equipped to the side of the lower fixing plate and includes a cylinder rod connected to the moving die.

The forward/backward cylinder may be a pneumatic cylinder.

The moving die may be slidably disposed on the lower fixing plate corresponding to the lower portion of the end of the core.

The moving die may include a guiding surface that is slantedly formed for guiding the crash box and a cam surface that is slantedly formed for being inserted under the core.

The forming unit may include a driving cylinder that is disposed on the upper fixing plate and includes a driving cylinder rod, wherein a through-hole may be formed to the upper fixing plate for the driving cylinder rod to be inserted therein, and the punch may be connected to the driving cylinder rod.

A second notch forming portion may be formed to a lower surface of the punch.

A height of the core may be less than that of the crash box.

The driving cylinder may be a hydraulic cylinder.

The posts may connect each corner of the upper fixing plate and the lower fixing plate.

A notch pressing device for a crash box of a vehicle according to an exemplary embodiment of the present invention may include a lower fixing plate, an upper fixing plate mounted to the lower fixing plate by a plurality of posts and with a through-hole formed thereto, a fixing die that is fixed to an upper portion of the lower fixing plate, a motor that is disposed outside of the fixing die and of which a rotating shaft is disposed thereto, a core that is connected to the rotating shaft of the motor and that is rotatable by operation of the motor, and the core of which a first notch forming portion is formed to a surface thereof, and of which of the crash box is put thereto, a forward/backward cylinder that is equipped to a side of the lower fixing plate and includes a forward/backward cylinder rod, a moving die that is slidably disposed on the lower fixing plate corresponding to a lower portion of an end of the core and connected to the forward/backward cylinder rod of the forward/backward cylinder for selectively supporting a lower portion of the core, a driving cylinder that is disposed on the upper fixing plate and includes a driving cylinder rod inserted into the through-hole, and a punch that is connected to an end of the driving cylinder rod, of which a second notch forming portion is formed to a lower surface of the punch, and the punch selectively pushing the crash box put to the core for forming a notch.

The posts may connect each corner of the upper fixing plate and the lower fixing plate.

A height of the core may be less than that of the crash box.

The motor may be a servo motor configured to control rotation speed and rotating direction.

The moving die may include a guiding surface which is slantedly formed for guiding the crash box and a cam surface which is slantedly formed for being inserted under the core.

According to an exemplary embodiment of the present invention, a notch may be formed by putting a crash box to a core and pushing it with a punch.

According to an exemplary embodiment of the present invention, a plurality of kinds of notches may be easily formed in a closed sectional tube such as a crash box by replacement of a core and a punch.

| <Description of Symbols> | |
|---|---|
| 1: notch pressing device | 3: lower fixing plate |
| 5: upper fixing plate | 7: post |
| 10: core rotating unit | 11: core |
| 13: fixing die | 15: motor |
| 20: supporting unit | 21: moving die |
| 23: forward/backward cylinder | 25: forward/backward cylinder rod |
| 30: forming unit | 31: punch |
| 33: driving cylinder | 35: driving cylinder rod |
| CB: crash box | N: notch |

DETAILED DESCRIPTION OF THE EMBODIMENTS

An exemplary embodiment of the present invention will hereinafter be described in detail with reference to the accompanying drawings.

In the description, unrelated parts of an exemplary embodiment of the present invention are omitted for convenience of understanding.

Figure 1:
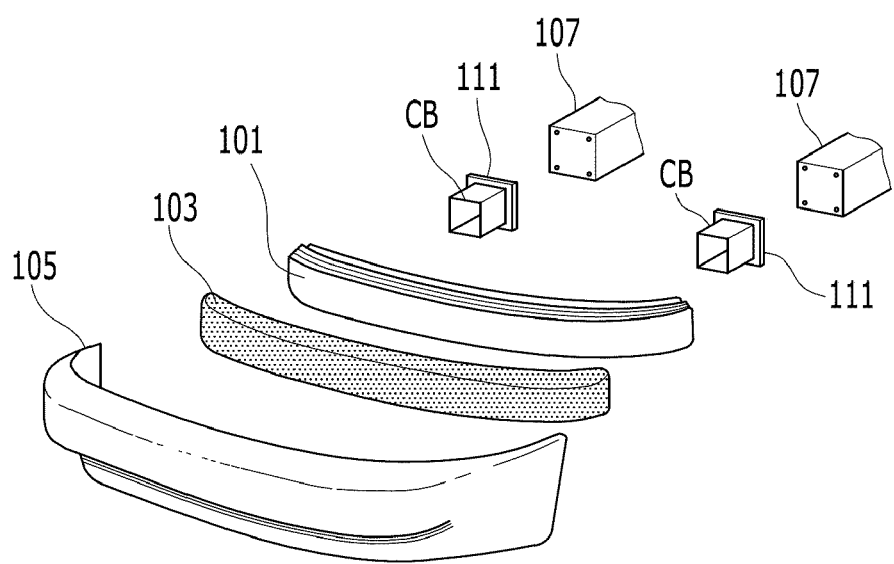
FIG. 1 is an exploded perspective view of a conventional bumper system for a vehicle.
Figure 2:
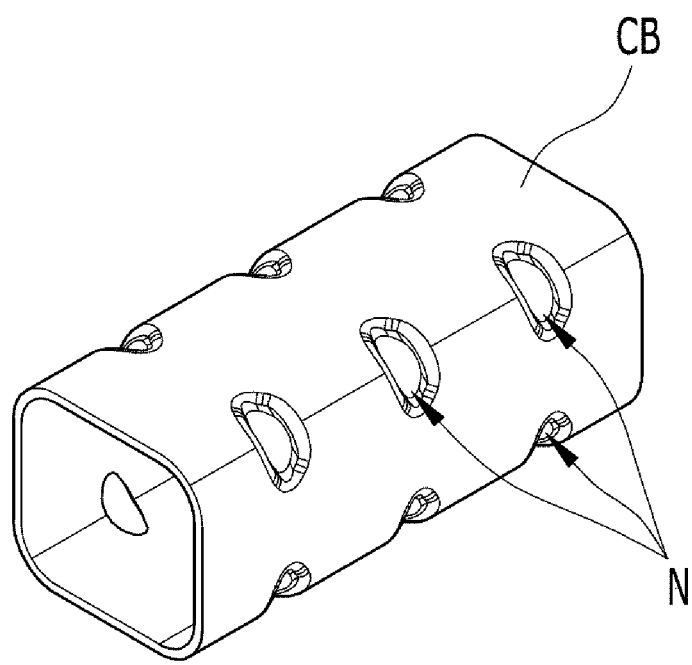
FIG. 2 is a perspective view of a conventional crash box in which a notch is formed.
Figure 3:
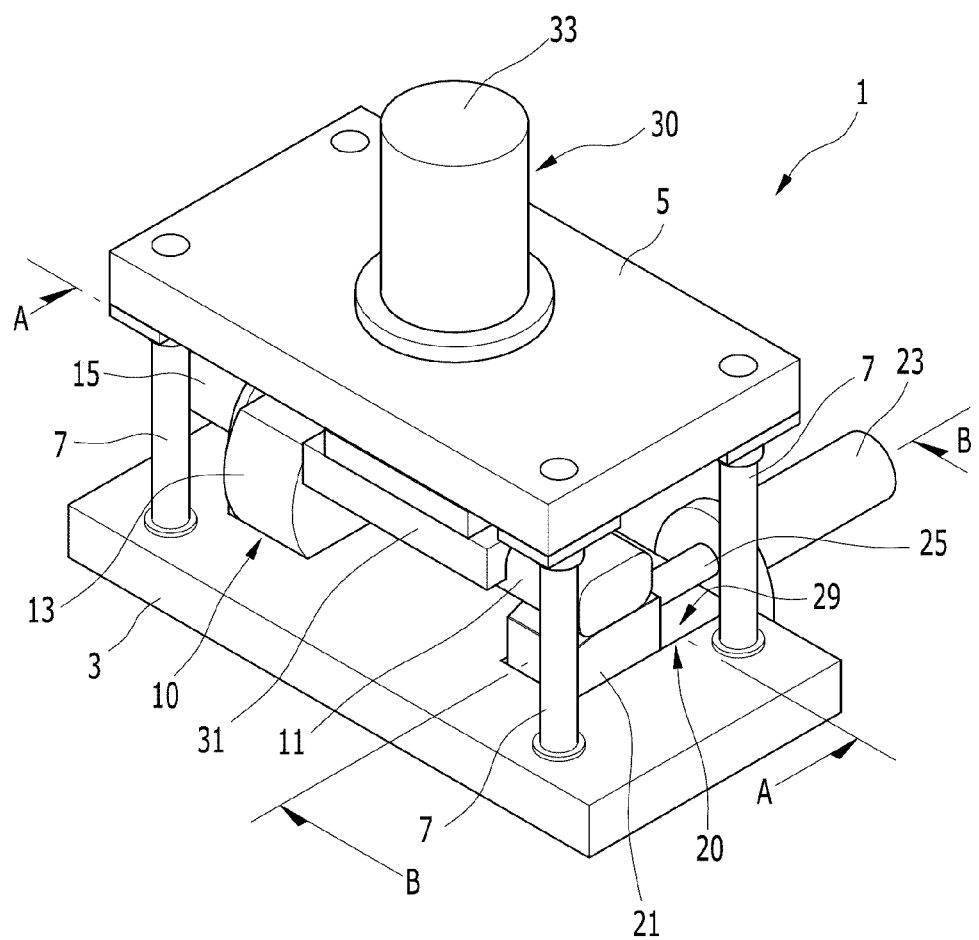
FIG. 3 is a perspective view of a notch pressing device according to an exemplary embodiment of the present invention.
Figure 4:
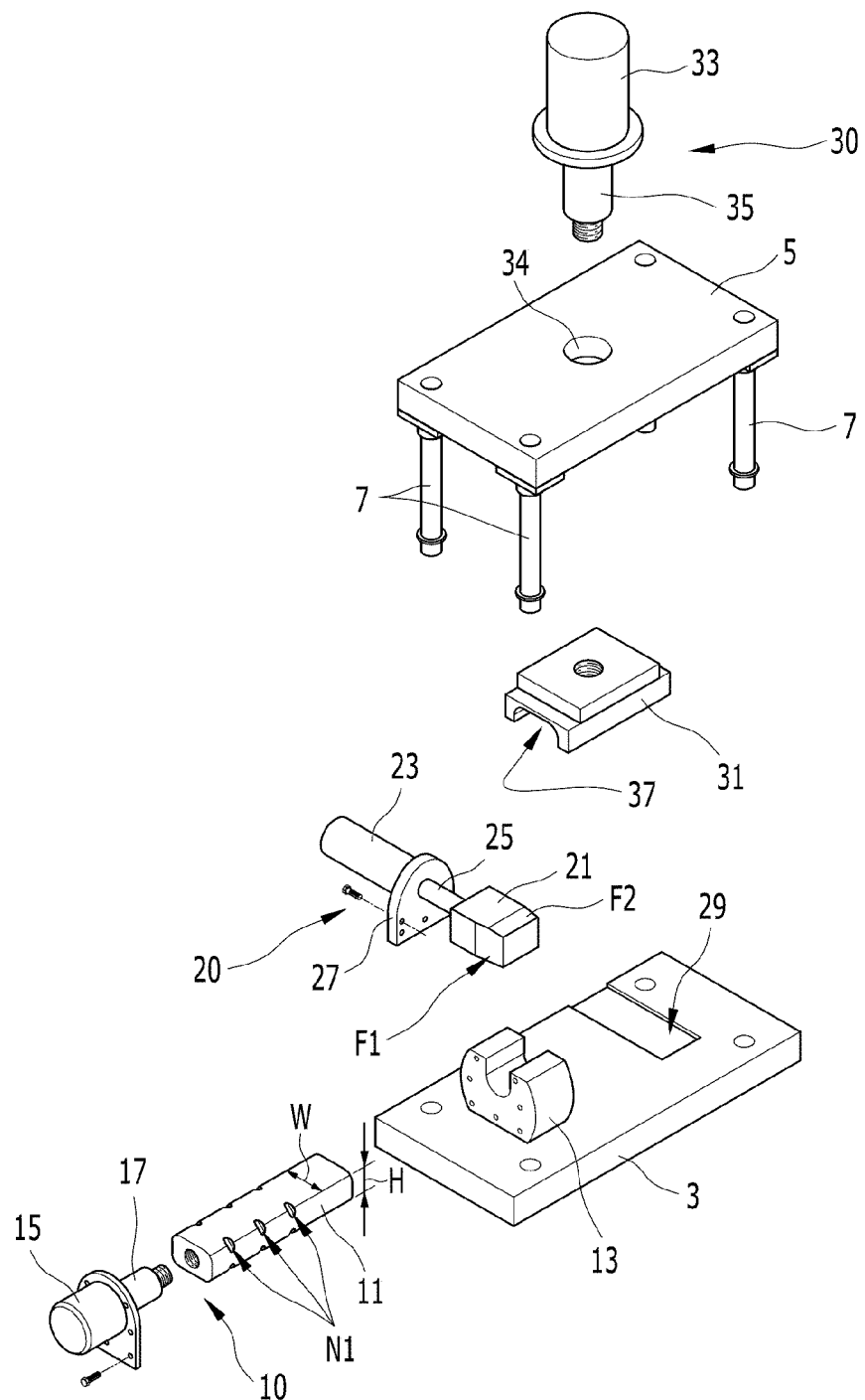
FIG. 4 and FIG. 5 are exploded perspective views of a notch pressing device according to an exemplary embodiment of the present invention.
Figure 5:
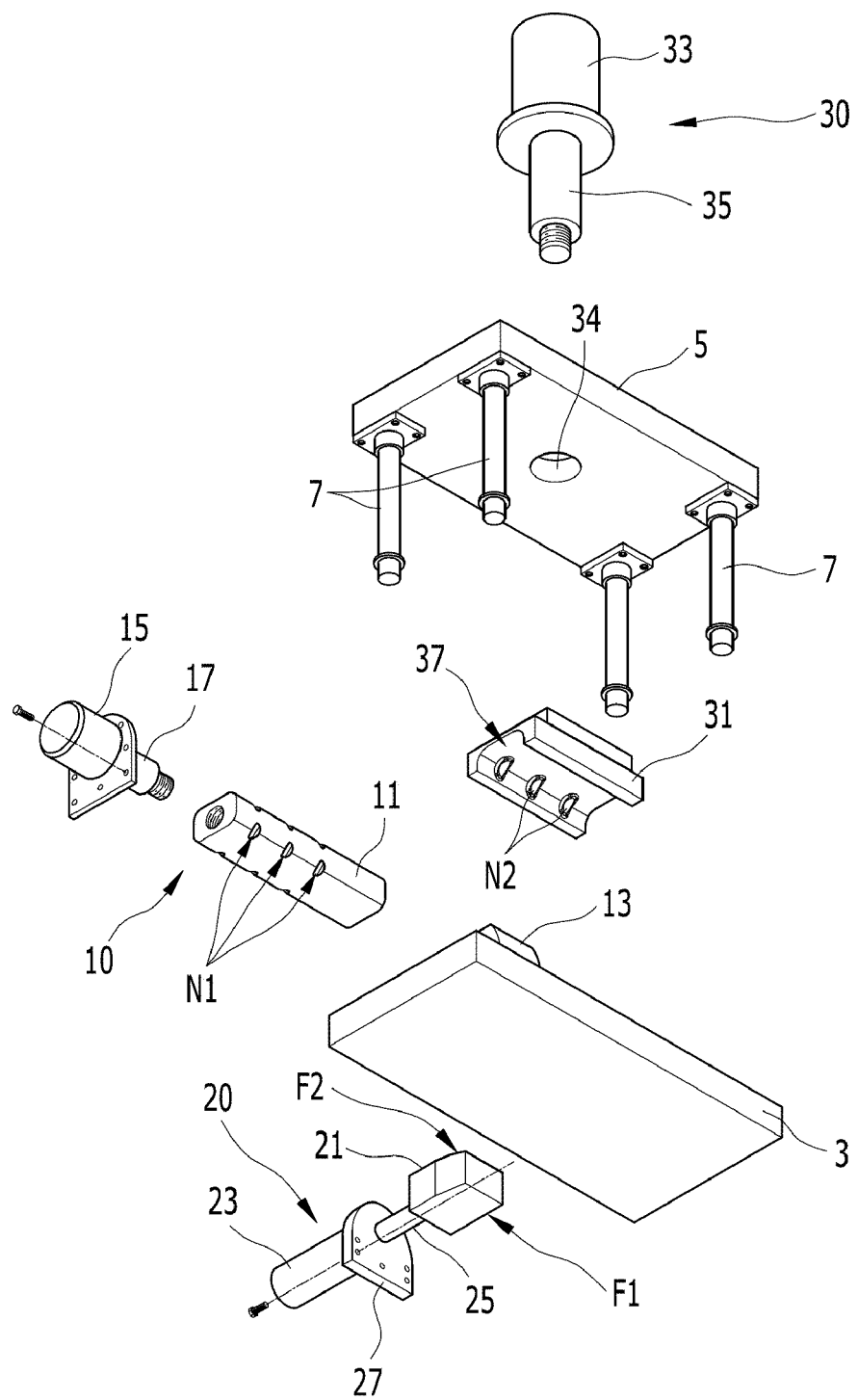

FIG. 3 is a perspective view of a notch pressing device according to an exemplary embodiment of the present invention, and FIG. 4 and FIG. 5 are exploded perspective views of a notch pressing device according to an exemplary embodiment of the present invention.

Referring to FIG. 3 to FIG. 5, a notch pressing device 1 according to an exemplary embodiment of the present invention includes a lower fixing plate 3, an upper fixing plate 5, a core rotating unit 10, a supporting unit 20, and a forming unit 30.

The lower fixing plate 3 has a plate shape and is disposed on a floor of a workroom.

The upper fixing plate 5 is equipped to the lower fixing plate 3 using a plurality of posts 7.

The posts connect each corner of the upper fixing plate 5 and the lower fixing plate 3.

The core rotating unit 10 is disposed to a side of the lower fixing plate 3 for selectively rotating a core 11 where the crash box CB is placed.

Figure 6:
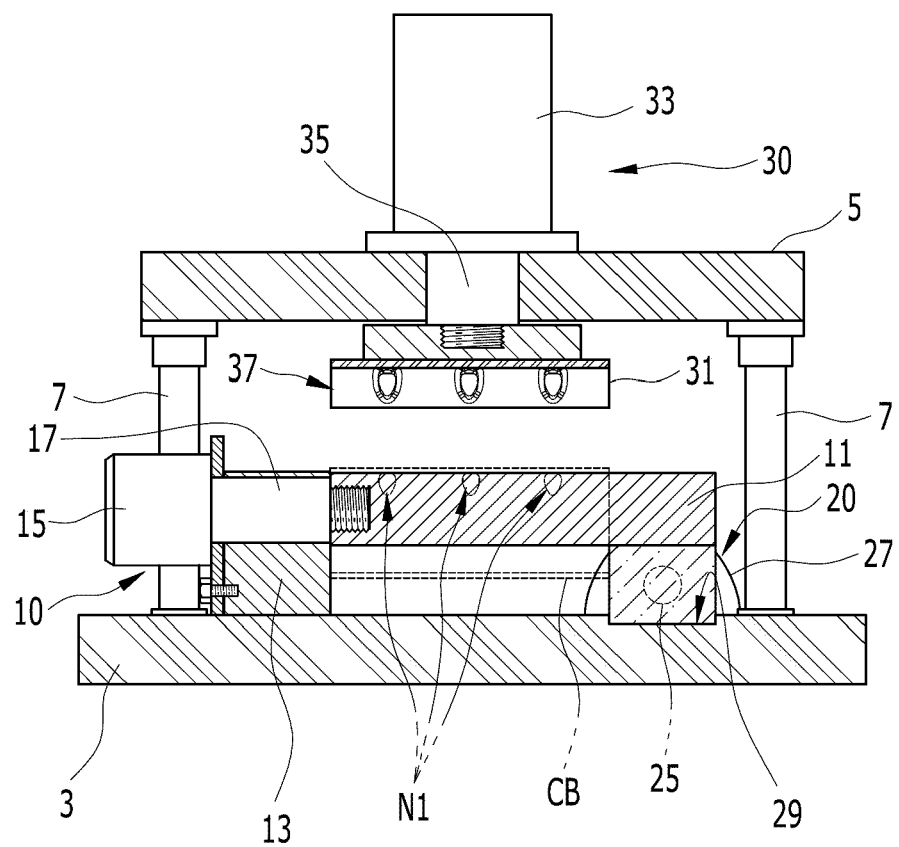
FIG. 6 is a cross-sectional view along line A-A of FIG. 3.

Referring to FIG. 6, the core rotating unit 10 includes a fixing die 13 disposed on a side of the lower fixing plate 3 and a motor 15 disposed to an outer side of the fixing die 13.

The motor 15 may be a servo motor configured to control rotation speed and rotating direction, but is not limited thereto.

The core 11 is connected to a rotating shaft 17 of the motor 15.

The core 11 may be shaped as a rectangular block, and a first notch forming portion N1 is formed to a surface thereof.

Referring to FIG. 4 and FIG. 6, a height H of the core 11 is less than that of the crash box CB, which is placed to have notches formed therein, and a width of the core 11 may be predetermined to allow the crash box CB to be positioned.

Figure 7:
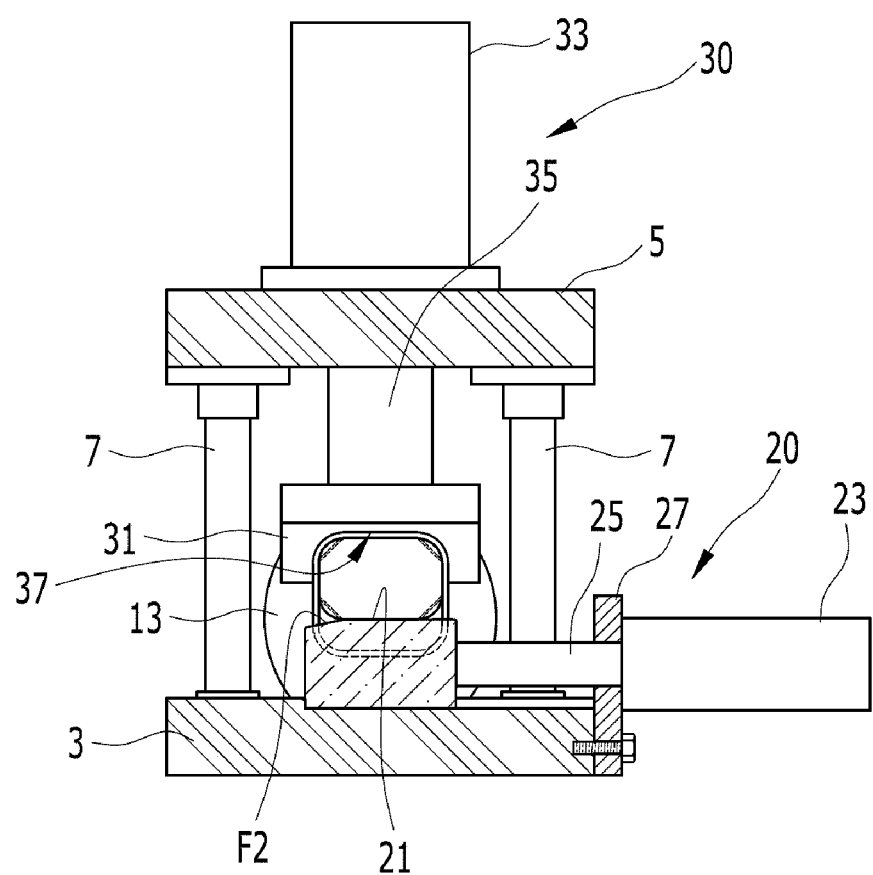
FIG. 7 is a cross-sectional view along line B-B of FIG. 3.

The supporting unit 20, referring to FIG. 4 and FIG. 7, includes a forward/backward cylinder 23 disposed to a side of the lower fixing plate 3, and the forward/backward cylinder 23 includes a forward/backward cylinder rod 25. The forward/backward cylinder rod 25 is connected a moving die 21 that supports a lower portion of an end of the core 11, and the moving die 21 die is slidably disposed on the lower fixing plate 3 corresponding to the lower portion of the end of the core 11.

The supporting unit 20 is disposed to a side of the lower fixing plate 3 using a bracket 27.

The forward/backward cylinder 23 may be a pneumatic cylinder using pneumatic pressure as a power source, but is not limited thereto.

The moving die 21 moves along a slide groove 29 formed on the lower fixing plate 3, and selectively supports the lower portion of the end of the core 11 according to operations of the forward/backward cylinder 23.

The moving die 21, as shown in FIG. 4, may be formed as a hexahedral block, and includes a guiding surface F1 that is slantedly formed for guiding the crash box CB and a cam surface F2 that is slantedly formed to be inserted under the core 11.

When the moving die 21 slidably moves forward, the guiding surface F1 pushes an end of the crash box CB where the core 11 is put to so that the crash box CB moves toward the core rotating unit 10.

Further, if the moving die 21 slidably moves forward, the moving die 21 moves under the lower portion of the end of the core 11 due to the cam surface F2 of the moving die 21.

Referring to FIG. 4 to FIG. 6, the forming unit 30 pushes the crash box CB placed at the core 11 using a punch 31 to form a notch N in the crash box CB.

The forming unit 30 includes a driving cylinder 33 disposed on the upper fixing plate 5, and the driving cylinder 33 includes a driving cylinder rod 35. A through-hole 34 is formed to the upper fixing plate 5 for the driving cylinder rod 35 to be inserted therein.

The driving cylinder 33 may be a hydraulic cylinder using hydraulic pressure as a power source, but is not limited thereto.

The punch 31 is connected to an end of the driving cylinder 33.

A second notch forming portion N2 is formed to a lower surface 37 of the punch 31 corresponding to the core 11.

The second notch forming portion N2 corresponds to the first notch forming portion N1 of the core 11, and the second notch forming portion N2 and the first notch forming portion N1 form the notch N in the crash box CB.

In the drawings, the first notch forming portion N1 is formed as a concave groove and the second notch forming portion N2 is formed as a protrusion corresponding to the first notch forming portion N1, however it is not limited to the drawings. On the contrary, the first notch forming portion N1 may be formed as a protrusion and the second notch forming portion N2 may be formed as a concave groove.

Also, both of the first notch forming portion N1 and the second notch forming portion N2 may be formed as protrusions and may form the notch N by pushing the punch 31.

In the drawings, the notch N is formed to corners of the crash box CB, but it is not limited thereto.

Hereinafter, referring to FIG. 8 to FIG. 14, operations of the notch pressing device 1 according to an exemplary embodiment of the present invention will be described.

Figure 8:
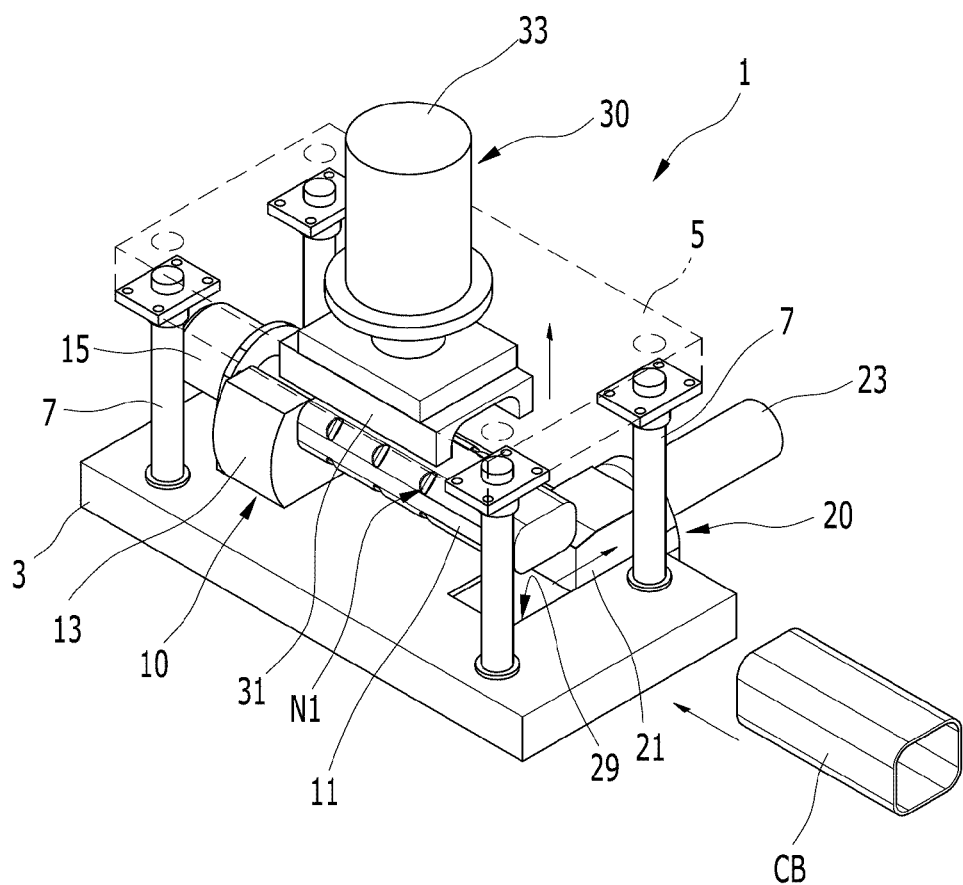
FIG. 8 to FIG. 14 are drawings showing operations of a notch pressing device according to an exemplary embodiment of the present invention.

Referring to FIG. 8, the punch 31 moves up by backward operation of the driving cylinder 33, and the moving die 21 is separated from the lower portion of the end of the core 11 by backward operation of the forward/backward cylinder 23.

The closed sectional tube type crash box CB is then put to the core 11.

Figure 9:
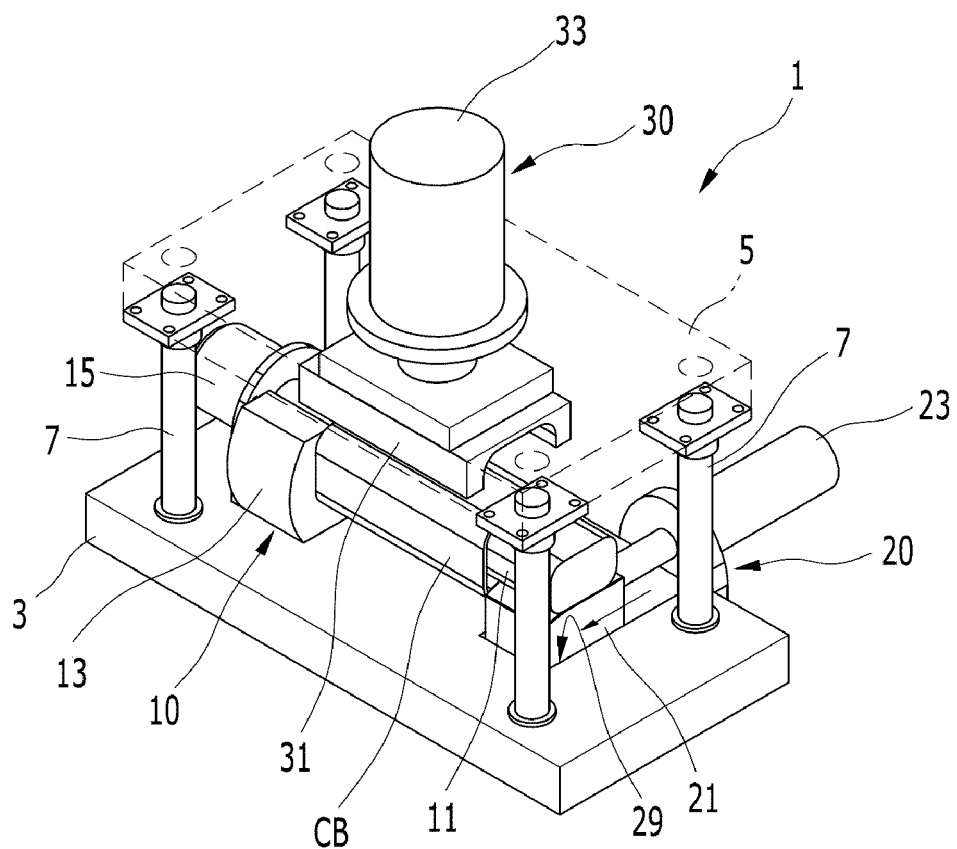

Then, referring to FIG. 9, the forward/backward cylinder 23 operates forward for the moving die 21 to be slidably moved forward.

Thus, the moving die 21 is positioned between the lower fixing plate 3 and the core 11 for supporting the lower portion of the end of the core 11.

While sliding the moving die 21, the guiding surface F1 pushes the end of the crash box CB put to the core 11 and thus the crash box CB is positioned at a predetermined position of the core 11.

Figure 10:
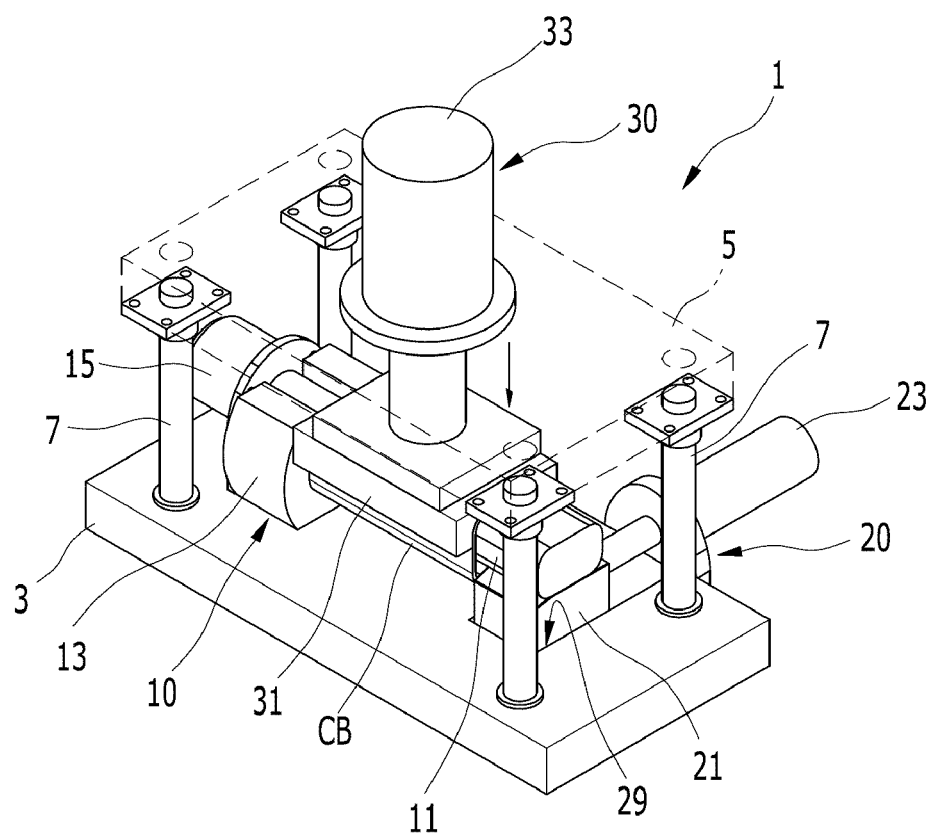

After the moving die 21 supports the lower portion of the end of the core 11 and the crash box CB is positioned, referring to FIG. 10, the driving cylinder 33 drives forward for the punch 31 to move down.

The punch 31 pushes or pressurizes an upper surface of the crash box CB put to the core 11, and thus a plurality of notches N are primarily formed.

Figure 11:
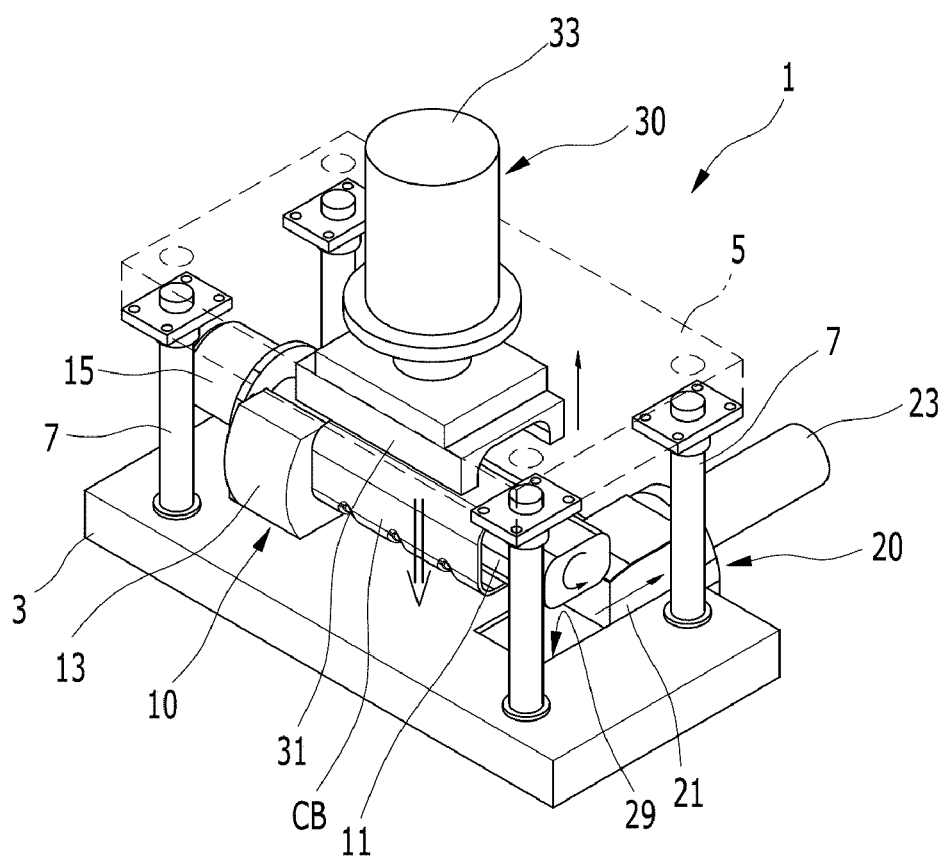

After primarily forming the notches N to the crash box CB, referring to FIG. 11, the driving cylinder 33 drives backward for the punch 31 to move up and the forward/backward cylinder 23 drives backward for the moving die 21 to be separated from the lower portion of the end of the core 11.

The motor 15 is then operated for the core 11 to rotate 180°.

Then the crash box CB put to the core 11 is upside down for the upper surface where the notch N is formed to be moved down.

Figure 12:
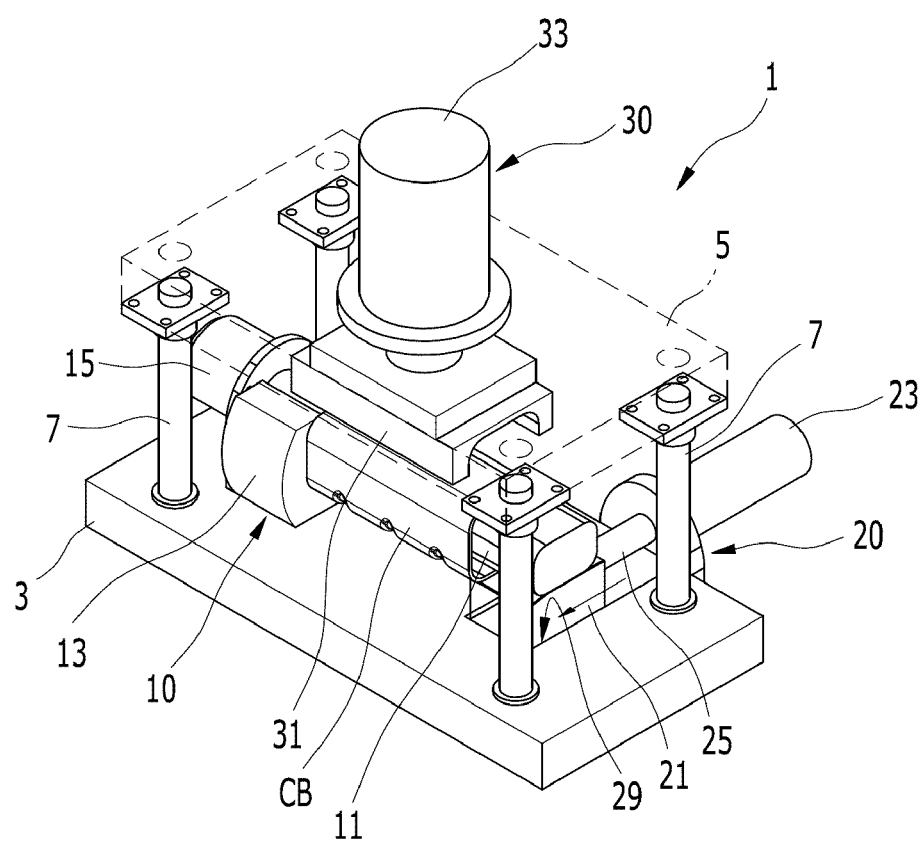

Referring to FIG. 12, the forward/backward cylinder 23 then operates forward for the moving die 21 to be slidably moved forward.

The moving die 21 is thus positioned between the lower fixing plate 3 and the core 11 for supporting the lower portion of the end of the core 11.

Also, while sliding the moving die 21, the guiding surface F1 pushes the end of the crash box CB put to the core 11 and thus the crash box CB is positioned at a predetermined position of the core 11.

Figure 13:
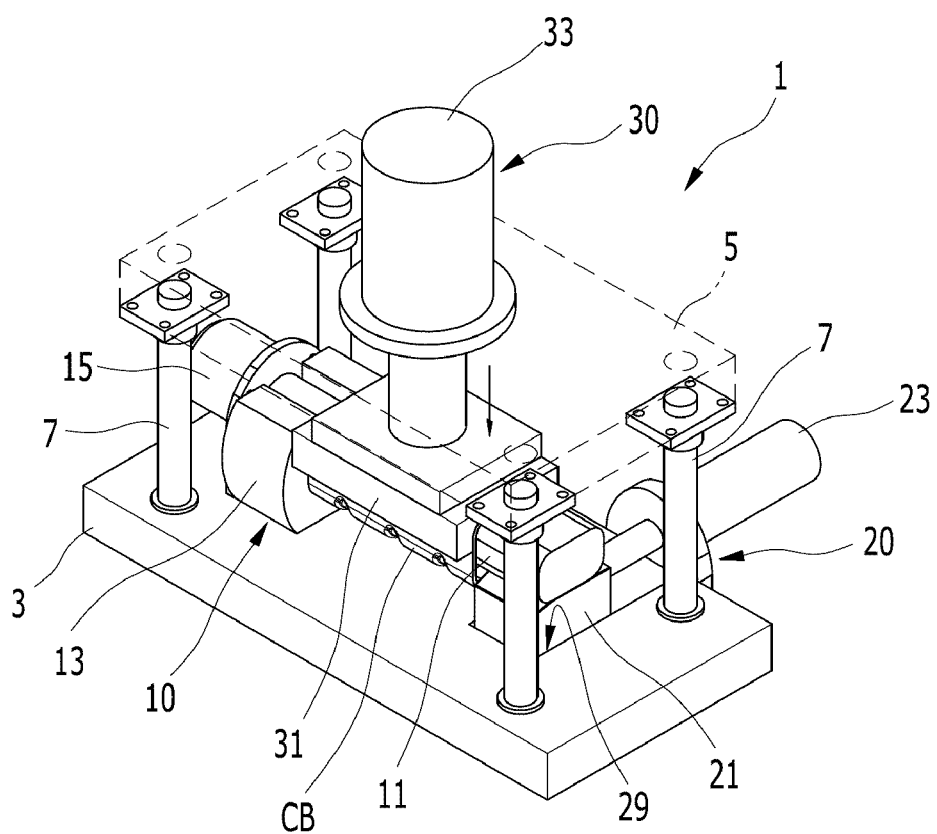

After the moving die 21 supports the lower portion of the end of the core 11 and the crash box CB is positioned, referring to FIG. 13, the driving cylinder 33 drives forward for the punch 31 to move down. The punch 31 pushes or pressurizes an upper surface of the crash box CB put to the core 11, and thus a plurality of notches N are secondarily formed.

Figure 14:
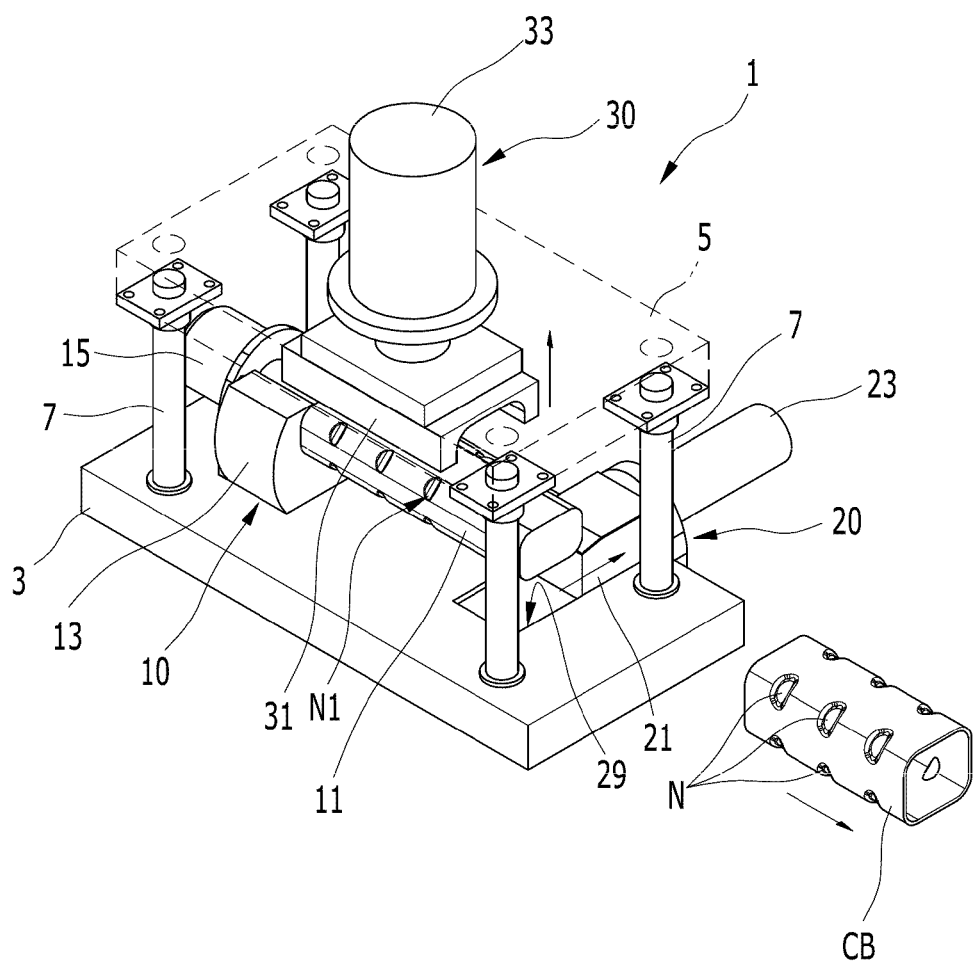

After the notches N are formed to both surface of the crash box CB, as shown in FIG. 14, the driving cylinder 33 drives backward for the punch 31 to move up and the forward/backward cylinder 23 drives backward for the moving die 21 to be separated from the lower portion of the end of the core 11.

The crash box CB is then removed from the core 11.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A notch pressing device for a crash box of a vehicle, comprising:
   a lower fixing plate;
   an upper fixing plate mounted to the lower fixing plate by a plurality of posts;
   a core rotating unit that selectively rotates a core where the crash box is put and is disposed to one end of the lower fixing plate;
   a supporting unit that is connected to a moving die for selectively supporting a lower portion of an end of the core and disposed to a side of the lower fixing plate; and
   a forming unit that is connected to a punch, which selectively pushes the crash box put to the core for forming the notch, and that is disposed to the upper fixing plate.

2. The notch pressing device of claim 1, wherein the core rotating unit comprises:
   a fixing die that is fixed to an upper portion of the lower fixing plate; and
   a motor that is disposed outside of the fixing die and of which a rotating shaft is disposed thereto.

3. The notch pressing device of claim 2, wherein the core is connected to the rotating shaft and a first notch forming portion is formed to a surface of the core.

4. The notch pressing device of claim 3, wherein the motor is a servo motor configured to control rotation speed and rotating direction.

5. The notch pressing device of claim 1, wherein the supporting unit comprises a forward/backward cylinder that is equipped to the side of the lower fixing plate and includes a cylinder rod connected to the moving die.

6. The notch pressing device of claim 5, wherein the forward/backward cylinder is a pneumatic cylinder.

7. The notch pressing device of claim 5, wherein the moving die is slidably disposed on the lower fixing plate corresponding to the lower portion of the end of the core.

8. The notch pressing device of claim 7, wherein the moving die comprises:
   a guiding surface that is slantedly formed for guiding the crash box; and
   a cam surface that is slantedly formed for being inserted under the core.

9. The notch pressing device of claim 1, wherein the forming unit comprises a driving cylinder that is disposed on the upper fixing plate and includes a driving cylinder rod,
wherein a through-hole is formed to the upper fixing plate for the driving cylinder rod to be inserted therein, and the punch is connected to the driving cylinder rod.

10. The notch pressing device of claim 9, wherein a second notch forming portion is formed to a lower surface of the punch.

11. The notch pressing device of claim 10, wherein a height of the core is less than that of the crash box.

12. The notch pressing device of claim 9, wherein the driving cylinder is a hydraulic cylinder.

13. The notch pressing device of claim 1, wherein the posts connect each corner of the upper fixing plate and the lower fixing plate.

14. A notch pressing device for a crash box of a vehicle, comprising:
- a lower fixing plate;
- an upper fixing plate mounted to the lower fixing plate by a plurality of posts and with a through-hole formed thereto;
- a fixing die that is fixed to an upper portion of the lower fixing plate;
- a motor that is disposed outside of the fixing die and of which a rotating shaft is disposed thereto;
- a core that is connected to the rotating shaft of the motor and that is rotatable by operation of the motor, and the core of which a first notch forming portion is formed to a surface thereof, and of which of the crash box is put thereto;
- a forward/backward cylinder that is equipped to a side of the lower fixing plate and includes a forward/backward cylinder rod;
- a moving die that is slidably disposed on the lower fixing plate corresponding to a lower portion of an end of the core and connected to the forward/backward cylinder rod of the forward/backward cylinder for selectively supporting a lower portion of the core;
- a driving cylinder that is disposed on the upper fixing plate and includes a driving cylinder rod inserted into the through-hole; and
- a punch that is connected to an end of the driving cylinder rod, of which a second notch forming portion is formed to a lower surface of the punch, and the punch selectively pushes the crash box put to the core for forming a notch.

15. The notch pressing device of claim 14, wherein the posts connect each corner of the upper fixing plate and the lower fixing plate.

16. The notch pressing device of claim 14, wherein a height of the core is less than that of the crash box.

17. The notch pressing device of claim 14, wherein the motor is a servo motor configured to control rotation speed and rotating direction.

18. The notch pressing device of claim 14, wherein the moving die comprises:
- a guiding surface that is slantedly formed for guiding the crash box; and
- a cam surface that is slantedly formed for being inserted under the core.

* * * * *